United States Patent [19]

Rich

[11] Patent Number: 4,886,240

[45] Date of Patent: Dec. 12, 1989

[54] DEWAR CRYOPUMPING USING BARIUM OXIDE COMPOSITE FOR MOISTURE REMOVAL

[75] Inventor: Benjamin K. Rich, Santa Barbara, Calif.

[73] Assignee: Santa Barbara Research Center, Goleta, Calif.

[21] Appl. No.: 260,168

[22] Filed: Oct. 20, 1988

[51] Int. Cl.$^4$ .............................................. G01J 5/06
[52] U.S. Cl. ...................................... 250/352; 62/51.3
[58] Field of Search .......................... 250/352, 370.15; 62/514 R

[56] References Cited

U.S. PATENT DOCUMENTS 4,474,036  10/1984  Ball et al. ............................. 250/352
4,719,353  1/1988   Peck, Jr. et al. ..................... 250/352

Primary Examiner—Carolyn E. Fields
Attorney, Agent, or Firm—W. C. Schubert; W. K. Denson-Low

[57] ABSTRACT

A non-evacuated dewar 10 advantageously employs a molecular sieve 30 that serves to adsorb gasses in the dewar when cooled during operation of the detector 24 thereby preventing liquid formation onto the detector. The effects of outgassing and permeation during storage are substantially eliminated because the dewar package is in partial pressure equilibrium with its environment since the interior of the dewar is backfilled with the same inert gas as is in the surrounding outside environment. A desiccant 40 made of a barium oxide/RTV silicone rubber composite may be used to adsorb moisture which may permeate into the housing.

12 Claims, 1 Drawing Sheet

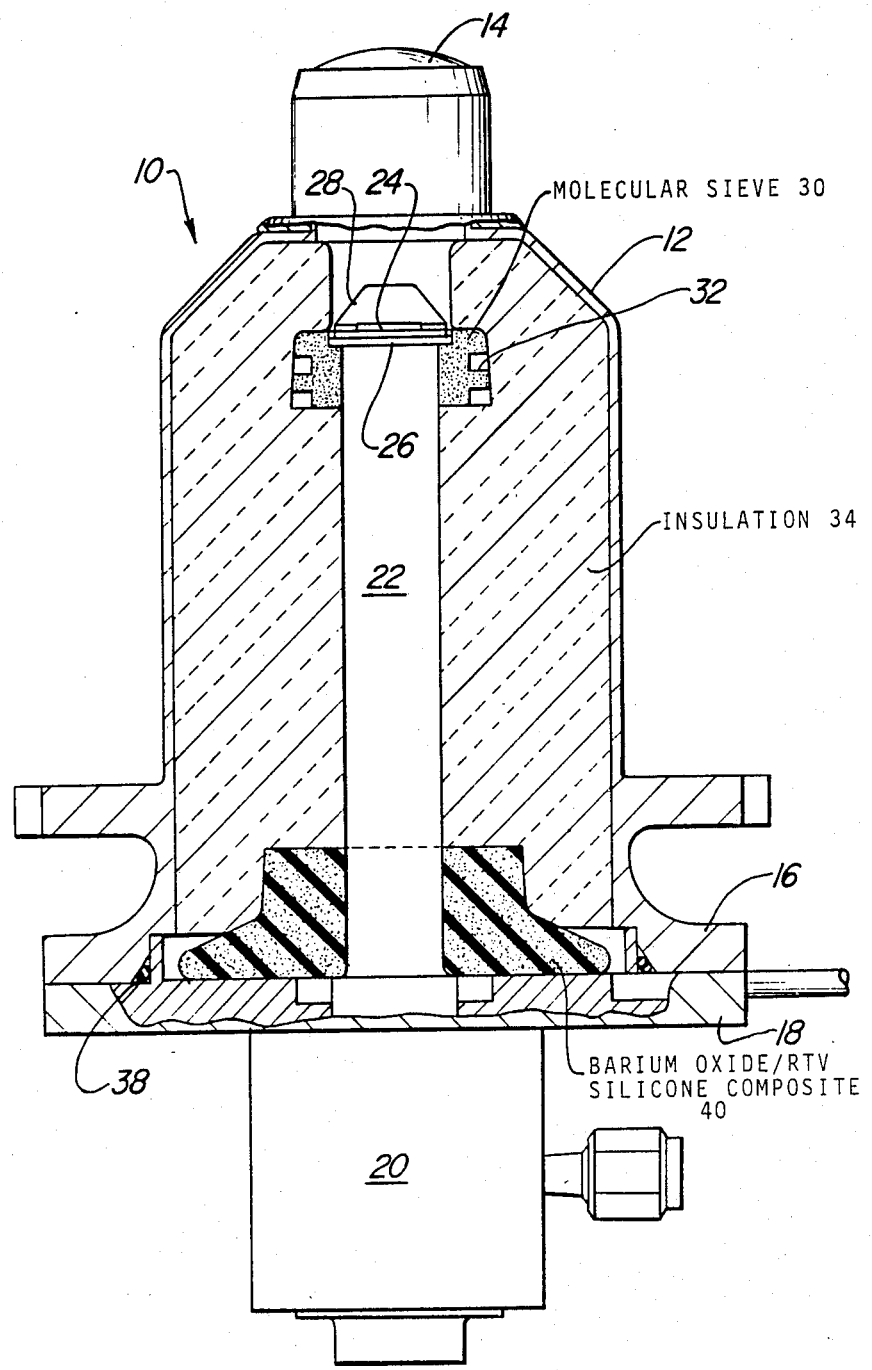

DEWAR CRYOPUMPING USING BARIUM OXIDE COMPOSITE FOR MOISTURE REMOVAL

BACKGROUND OF THE INVENTION

1. Technical Field

This invention relates to hermetically sealed packages and, more particularly, to dewars containing infrared detectors.

2. Discussion

Some sensors, particularly mercury-cadmiumtelluride infrared detectors, are most sensitive when operating at approximately 77°K. These detectors are typically used in conjunction with an evacuated dewar in which the detector is placed. The evacuation of the dewar is used to remove gasses which would otherwise occupy the region surrounding the detector so that the potential heat loss through convection and conduction during operation is minimized, as well as to eliminate the formation of liquid onto the detector. The detector is generally mounted onto the tip of a coldfinger which is in communication with a cryoengine assembly. During operation the cryoengine serves to expand a fluid such as helium in the coldfinger which, in turn, adsorbs thermal energy causing the detector to be cooled.

While the traditional evacuated dewar has generally operated satisfactorily, it does have some drawbacks. For example, the choice of materials that are used to fabricate the dewar is somewhat limited and expensive because it is necessary to choose materials having special characteristics such as low diffusivity, low outgassing and other properties. Furthermore, implementing the necessary closure techniques required to create the vacuum inside the dewar is often costly and it is sometimes difficult to ensure that the vacuum is maintained over a long period of time.

U.S. Pat. No. 4,719,353 discloses a non-evacuated dewar in which polymeric foam is disposed between the expander or coldfinger and the housing. While the above document discloses a dewar which has its advantages, it also has its own set of shortcomings and can be further improved.

SUMMARY OF THE INVENTION

In accordance with the teachings of the preferred embodiment of this invention, cryopumping means include a molecular sieve which is mounted to the dewar coldfinger adjacent the detector. When the coldfinger is cooled by the cryoengine, it also cools the molecular sieve causing it to adsorb gas in the dewar housing next to the detector. As a result, the pressure in the dewar is reduced to prevent liquid formation on the detector as well as minimizing convection and conduction losses. These advantages are economically obtained while avoiding the problems of the traditional evacuated dewar construction. The dewar further includes a desiccant employing an irreversible dehydration mechanism to adsorb moisture in the dewar. Preferably, the desiccant is a barium oxide/RTV silicone rubber composite.

BRIEF DESCRIPTION OF THE DRAWING

The various advantages of the present invention will become apparent to one skilled in the art after reading the following specification and by reference to the drawing in which:

FIG. 1 is a cross-sectional view of a dewar made in accordance with the teachings of the preferred embodiment of this invention.

DESCRIPTION OF THE PREFERRED EMBODIMENT

The aforementioned U.S. Pat. No. 4,719,353 discloses many of the details of a dewar of the general type to which the present invention pertains. The '353 patent is hereby incorporated by reference and the reader's attention is drawn to that patent for background information. The following specification accordingly focuses on a concise description of the contribution to the art made by this invention.

Briefly, the dewar 10 includes a housing 12 with a lens cap assembly 14 at one end thereof and a mounting flange 16 at an opposite lower end thereof. Flange 16 is suitably connected to a mounting plate 18 which, in turn, carries a suitable cryoengine 20. Cryoengine 20 is coupled to a coldfinger 22 which projects upwardly through the major extent of housing 12. An infrared detector 24 is mounted to the tip 26 of coldfinger 22. A cold shield 28 surrounds detector 24 and includes an aperture in an upper portion thereof acting as a field stop to restrict the field of view of detector 24 in a known manner.

A molecular sieve 30 is in thermal contact with the tip 26 of coldfinger 22. As will appear, the purpose of molecular sieve 30 is to remove gasses from the area adjacent detector 24 when it is operating. When detector 24 is operating, the cryoengine 20 is energized to cause fluid contained within coldfinger 22 to expand thereby absorbing thermal energy to cool detector 24 to the preferred 77° K. Molecular sieve 30 has a particular affinity for the type of gasses in the area adjacent detector 24. Preferably, the dewar housing 12 is backfilled with an inert gas such as nitrogen at one atmosphere or atmospheric pressure. Thus, the gas adjacent detector 24 is predominately nitrogen in the preferred embodiment. However, other gasses such as argon and xenon can be alternatively used to backfill the package.

Molecular sieve 30 can be made of a variety of zeolite materials such as activated crystalline silicoaluminate with organic binders. This preferred material is commercially available from Multiform Desiccants under the trade designation NATRASORB 900. It is approximately 0.100 inch thick and about 0.400 inch in diameter. Sieve 30 is attached to the outer walls of coldfinger 22 adjacent tip 26 by way of adhesive. In the drawing, sieve 30 is shown with a plurality of annular grooves 32 which are for the purpose of increasing surface area to enhance gas adsorption.

Provision is made for reducing the amount of gas adjacent detector 24 that needs to be adsorbed by the sieve 30 during operation. To this end, much of the interior space within housing 12 is filled with insulation 34. Preferably, the insulation is made of a polymeric foam such as a polystyrene composite material. As can be seen in the drawing, there is no insulation in the space above detector 24 which could otherwise block thermal radiation to be sensed by the detector. The insulation serves a variety of functions such as reducing heat loss due to gas conduction and convection until the gas is adsorbed by the sieve 30, acting as a stiffener for the coldfinger 22 and it can also aid in positioning of control cables.

The dewar 10 is typically located in an outside environment containing nitrogen gas at one atmosphere pressure. Although the dewar 10 is also backfilled with nitrogen at atmospheric pressure and is therefore at equilibrium with the outside environment when in a non-operational state, there still exists a possibility of moisture permeating the interior of package, for example, through seals 38 between the mounting flange 16 and mounting plate 18. Moisture in an appreciable amount can degrade the cryopumping operation of molecular sieve 30. To remove moisture within the housing 12 a desiccant 40 is contained within the dewar 10. It is preferably located at the lower end of the housing 12 adjacent the seals 38 which represent the most likely point of entry of moisture.

The desiccant 40 preferably comprises barium oxide in a moisture permeable binder. The barium oxide is preferably in the form of a powder having a particle size of between 100 mesh and 400 mesh. Barium oxide powder of this type is commercially available from Alfa Chemicals under the trade designation No. 15107. Particle sizes of between 100–400 mesh are preferred because if the particle sizes of the barium oxide powder are too small they may react with available moisture too fast during storage and during mixing. This would result in a less reactive composite. On the other hand, if particle sizes are too large, the larger grain sizes could impair the properties of the composite because the barium oxide powder expands as it reacts with moisture.

The moisture permeable binder is preferably a polymeric resin of the addition curable type. For purposes of this invention, an addition curable resin is a polymeric resin which will cure without requiring moisture for cross-linking. While satisfactory results may be obtained by using other types of binders, it is preferred to use a room temperature vulcanizable (RTV) silicone rubber binder because of its good moisture permeability and ease of manufacture. More particularly, a two part RTV silicone rubber binder is preferred, among other things, for its storage advantages. A two part curable binder is a crosslinkable material having two parts that will cure when mixed together. For example, a first part containing an unsaturated organopolysiloxane curable by a catalyst, and a second part contains a polyfunctional silicon hydride catalyst.

A particularly preferred two part RTV silicone rubber binder of the addition curable type is available from Dow Corning as 93-500 low volatility silicone RTV. Sufficient information about this material is known to those skilled in the art so that the details thereof need not be set out herein. For more information about this material, the reader's attention is drawn to:

(1) "Chemistry and Technology of Silicones", Walter Knoll Academic Press, 2nd Ed. 1968 (4.3.4); and
(2) "Silicone Compounds Register and Review", B. Arkles, Petrarch System, 1987.

Briefly, the first part of the Dow Corning 93-500 RTV material is know as a "base" and it includes therein a high polymer dimethyl siloxane fluid having a small proportion of vinyl substituents. The total vinyl constituting less than 10 mole percent of the total organo substituents bonded to silicone in the fluid.

The amount of barium oxide powder mixed into the silicone RTV base can vary between about 1 to 99% of the total weight of the composite material. All parts and percentages used herein are by weight unless otherwise indicated. More preferably, the amount of barium oxide powder is about 10 to 75% by weight of the weight of the final composite part. A barium oxide content of less than 10% may have relatively slow drying characteristics for some uses. On the other hand, a barium oxide content of more than 75% may result in structural characteristics too poor for some applications because it may be difficult for the silicone rubber to sufficiently wet the barium oxide powder to evenly disperse the powder in the binder. An especially preferred ratio of barium oxide to binder is about 50% barium oxide and 50% binder.

In a specific example, 30 grams of barium oxide powder (Alfa Chemicals No. 15105) having a 325 mesh size is mixed by hand in a dry box with 30 grams of Dow Corning 93-500 low volatility silicone RTV base. This mixture is in the liquid state and should exhibit good shelf life with the barium oxide powder substantially evenly dispersed within the silicone RTV base. Thus, a substantial amount of this starting material can be mixed conveniently before hand and stored until a final part is desired to be made.

Then, the next step is to mix the second part of the silicone RTV rubber material (Dow Corning 93-500) with the liquid mixture containing the base and barium oxide. The second part is generally referred to as a catalyst and is a polyfunctional silicon hydride. In addition, the second part contains an effective percentage (1 to 50 ppm) of a platinum catalyst.

In the specific example, three grams of Dow 93-500 catalyst is added to the mixture and the ingredients thoroughly mixed in a dry box. Then, the catalyst-added mixture is poured into a suitable mold which has been formed into the desired shape which, in the illustrated embodiment, comprises a sleeve surrounding the lower end of coldfinger 22.

The mixture is left in the mold until the resin cures. In the specific example, the mixture is cured in a nitrogen purged convection oven at about 100° C. for 30 minutes. The preferred Dow Corning 93-500 RTV silicone rubber material is a vinyl endblock, platinum cured dimethyl polysiloxane. The addition cure mechanism of the chemical reaction during curing of such a resin is well known. After the resin has cured it is removed from the mold and used as desiccant 40.

When the detector 24 is not operating, the dewar components are substantially at room or ambient temperature, i.e., the cryoengine 20 is not functioning to cool the detector to its operating point which is below 80° K. and preferably about 77° K. In this non-operating condition, there exists nitrogen gas in the area above the detector 24 since the molecular sieve 30 is at equilibrium. Any moisture that permeates the seals and enters the interior of the dewar 12 is irreversibly adsorbed by the desiccant 40. Thus, the dewar 10 can exhibit extended shelf life. This is important since infrared detectors of this type may remain in their non-operating state for some period of time.

When it is desired to utilize the detector 24, the cryoengine 20 is operated to cool the coldfinger 22. As is known in the art, the tip 26 of coldfinger 22 is cooled more quickly than the lower portions thereof. The cooling of coldfinger tip 26 simultaneously cools the detector 24 and molecular sieve 30. The cooling of sieve 30 causes it to change from its equilibrium condition to a condition at which it adsorbs or getters gasses surrounding the detector 24. This adsorbing of gasses creates a "cryopumping" action in which the pressure in the dewar housing 12 is kept below the gas triple point, e.g., 94 torr for nitrogen, during operation of the detector 24. Thus, the possibility of a liquid forming onto the detector 24 is substantially eliminated. In addition, heat losses through convection and conduction are also substantially reduced.

When the dewar returns to its non-operational mode, the molecular sieve 30 desorbs the adsorbed gasses and the package returns to its equilibrium condition. Permeation during storage is kept to a minimum because the package is in partial pressure equilibrium with its outside environment. As noted above, moisture which may enter the package is removed by the desiccant 40. Any moisture permeates the RTV silicone rubber binder and chemically reacts with the barium oxide powder to form a hydrate and, thus, the moisture is irreversibly adsorbed. As a result the cryopumping efficiency of sieve 30 is maintained over an extended period of time since it does not adsorb much moisture.

Those skilled in the art can now appreciate that the present invention provides an economical, yet reliable dewar package construction that eliminates many of the problems associated with traditional evacuated dewars. It should be understood that while this invention was described in connection with one particular example, many modifications can be made thereto without departing from the spirit of this invention after having the benefit of studying the specification, drawing and following claims.

What is claimed is:

1. In a dewar having a housing and a detector mounted to the tip of a coldfinger for cooling the detector during operation thereof, the improvement comprising:
    a molecular sieve mounted to the coldfinger adjacent the detector; and
    desiccant means in the housing for irreversibly adsorbing moisture therein.

2. The improvement of claim 1 wherein the desiccant means comprises a composite material having barium oxide particles in a moisture permeable binder.

3. The improvement of claim 2 wherein the binder is an addition curable room temperature vulcanizable (RTV) silicone rubber.

4. The improvement of claim 3 wherein the barium oxide comprises about 10-75% by weight of the total weight of the composite material.

5. The composite of claim 4 wherein said binder is a vinyl endblocked, platinum cured dimethyl polysiloxane.

6. The improvement of claim 1 which further comprises insulation in the housing between the coldfinger and interior walls of the housing.

7. A non-evacuated dewar comprising:
    a housing having a mounting flange at one end and a lens cap assembly at an opposite end;
    a coldfinger substantially concentrically mounted in the housing and extending from the mounting flange end and having a tip terminating adjacent to the lens cap assembly;
    an infrared detector mounted to the tip of the coldfinger;
    a molecular sieve mounted to the coldfinger adjacent to the tip thereof;
    said dewar being backfilled with an inert gas at substantially one atmosphere pressure;
    cryoengine means coupled to the coldfinger for cooling the coldfinger when it is desired to operate the infrared detector;
    said molecular sieve comprising means for adsorbing said inert gas to reduce the pressure in the housing adjacent the sensor below the gas triple point of the gas to prevent liquid forming on the detector in response to operation of the cryoengine; and
    a desiccant surrounding lower portions of the coldfinger, said desiccant being a solid composite material including barium oxide powder substantially evenly dispersed in a moisture permeable binder, said binder being an addition curable room temperature vulcanizable (RTV) silicone rubber, and wherein the barium oxide powder is present in the amount of about 10-75% by weight of the weight of the composite material.

8. The dewar of claim 7 wherein the barium oxide powder comprises about 50% by weight of the total weight of the composite material.

9. The dewar of claim 7 wherein said desiccant is positioned in the housing adjacent the flange.

10. The dewar of claim 7 which further comprises:
    foam insulation between the coldfinger and interior walls of the housing.

11. A method of detecting infrared radiation by a detector in a dewar mounted on a tip of a coldfinger that is selectively cooled by a cryoengine when it is desired to operate the detector, said method comprising:
    mounting a molecular sieve to the coldfinger adjacent the detector;
    backfilling the dewar with an inert gas at substantially one atmosphere pressure;
    using the cryoengine to substantially simultaneously cool the detector and molecular sieve to below about 80° K.;
    said molecular sieve adsorbing said inert gas, when cooled, sufficiently to reduce the partial pressure within the dewar to below the gas triple point of the inert gas to prevent liquid from forming on the detector;
    using the detector, when cooled, to sense infrared radiation incident thereon;
    mounting in the dewar a body of barium oxide particles dispersed in a room temperature vulcanizable (RTV) silicone rubber binder; and
    using the body as a desiccant to remove moisture in the dewar.

12. The method of claim 11 wherein insulation is provided between the coldfinger and interior walls of the dewar.

* * * * *